Dec. 19, 1933.                    R. GUNN                   1,939,690
            SYNCHRONOUS ALTERNATING CURRENT INDUCTOR COMPASS
                           Filed Nov. 12, 1931
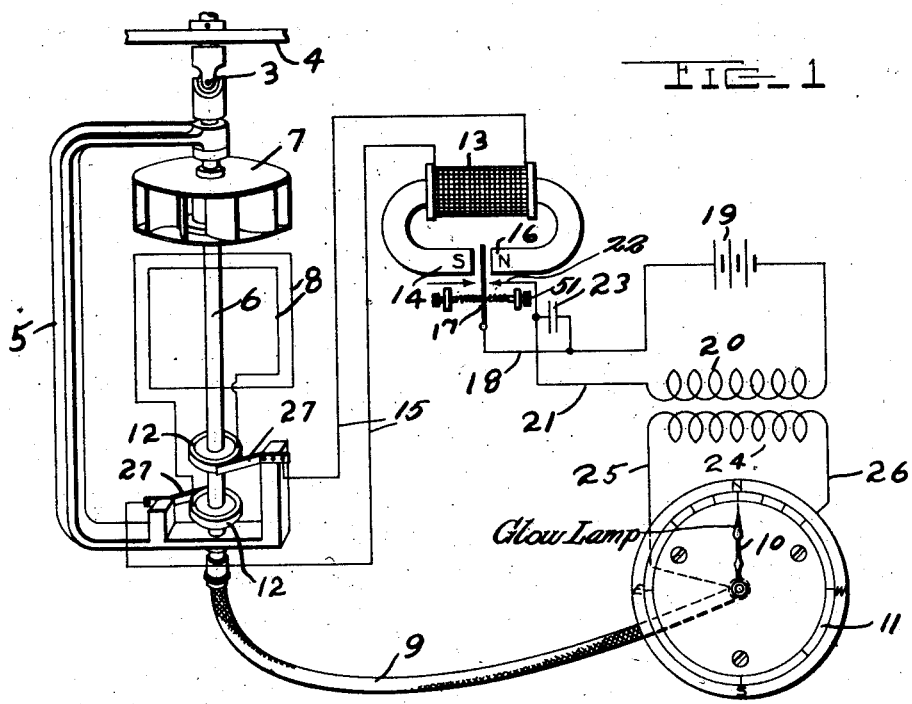
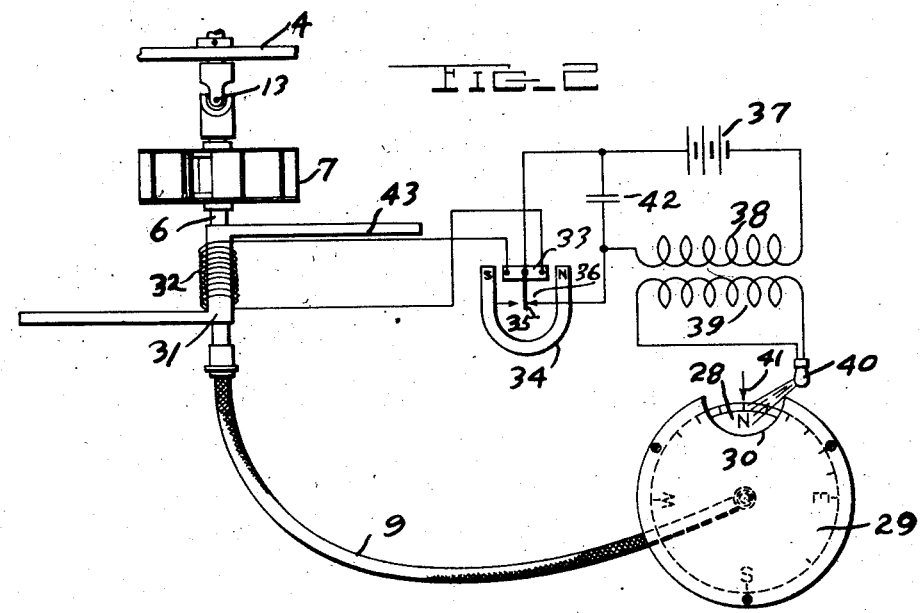
INVENTOR
Ross Gunn
BY
ATTORNEY Patented Dec. 19, 1933

1,939,690

UNITED STATES PATENT OFFICE 1,939,690

SYNCHRONOUS ALTERNATING CURRENT INDUCTOR COMPASS

Ross Gunn, Washington, D. C.

Application November 12, 1931
Serial No. 574,569

12 Claims. (Cl. 33—204)

(Granted under the act of March 3, 1883, as
amended April 30, 1928; 370 O. G. 757)

This invention relates to an inductor compass for ships and aircraft, and has for its object to provide means for instantaneously determining the position of an indicator operating in mechanical synchronism with an inductor, and also means to maintain the axis of the inductor perpendicular to the earth's surface at all times.

With the above and other objects in view, the invention consists in the construction, combination and arrangement of parts as will be hereinafter more fully described.

Reference is to be had to the accompanying drawing forming a part of this specification in which like reference characters indicate corresponding parts throughout the several views and in which:

Fig. 1 is a diagrammatic view of one embodiment of my invention in which the current is taken off the inductor by slip rings and brushes;

Fig. 2 is essentially like Fig. 1 except that the current is generated in a fixed coil and requires no rings and brushes.

Universal joint 3 is suspended from rigid hanger 4 and bracket 5 is supported by the universal joint. Shaft 6 is rotatably mounted in suitable bearings carried by bracket 5. Motor 7 is fixed on shaft 6 to rotate the shaft, on which the inductor coil 8 is also mounted to rotate therewith. Flexible shaft 9 has a driving connection with shaft 6 and also with index 10 that is a glow lamp, disposed to rotate over a compass dial 11.

The terminals of inductor coil 8 are connected to slip rings 12, from which the current induced in the coil by rotation in the earth's magnetic field is conducted through brushes 27 and wires 15 to coil 13 that is part of a polarized relay having spaced apart poles 14 and 16 between which is the vibratile armature 17 which may be so controlled by springs 50 and screws 51 that it will not respond and be drawn to one of the poles 14 or 16 except by substantially the maximum current set up in the inductor coil. The armature is connected to wire 18 that, with battery 19, coil 20, and wire 21, forms a closed circuit when armature 17 is drawn over against contact 22. A condenser 23 is shunted across wires 18 and 21 to prevent injury of the contact by the surge of current when the circuit is broken. Coil 24 is so inductively related to coil 20 that the high voltage induced in coil 20 when the circuit is broken will set up a high voltage current in coil 24 that will be transmitted to glow lamp index 10 through wire 25, connected to the index, and wire 26, connected to dial 11 with which the outer end of the index has electrical connection.

When the relay is properly adjusted the circuit through battery 19 and coil 20 will be broken once each revolution of the inductor coil 8, which will cause the generation of an instantaneous high potential in coil 20 and this in turn will induce a high potential in coil 24 that will cause a flash in index 10, and if coil 8 and the index are connected in the proper relation the course of the craft on which the device is mounted will be shown by the position of the index on dial 11. Universal joint 3 permits inductor coil 8 to hang vertically in all navigating positions of the craft, thereby insuring that a maximum number of lines of the earth's field will be cut by rotation of coil 8.

In Fig. 2 motor 7 is mounted on shaft 6 that is suspended from universal joint 3, the shaft 6 being connected to drive a semi-transparent compass card disk 28 through flexible shaft 9, the disk being rotatably mounted on a plate 29 that has a cut out portion 30 in the edge thereof through which a portion of the disk 28 may be illuminated. An inductor 31 of high permeability and low hysteretic loss having arms 43 to cut the lines of the earth's field is carried by shaft 6 to rotate therewith and a stationary coil 32 is disposed around inductor 31. Coil 32 is connected to inductive element 33 between the poles of magnet 34, an armature 35 being mounted on the said element. When armature 35 is against contact 36 it closes a circuit through battery 37 and coil 38, and permits current from the battery to flow; when the circuit is broken by movement of the armature away from the contact a high instantaneous voltage is set up in coil 38, which induces a voltage in coil 39 and causes a current to flow through glow lamp 40 to light the portion of the disk 28 that is exposed in notch 30. The connection between disk 28 and inductor 31 is such that the course of the craft will be indicated by the part of the scale on disk 28 that appears under lubber's line 41. A condenser 42 is connected across the circuit of coil 38 and battery 37 to prevent destructive sparking at contact 36 when the circuit is broken.

As the inductor 31 is rotated in the earth's field the magnetic flux therethrough will change, which will set up alternating potentials in coil 32, and the current thus made to flow will move armature 35 away from contact 36 once in each complete rotation of the inductor, breaking the circuit through coil 38 and so causing lamp 40 to flash, the course of the craft being shown at that time by the scale on disk 28 under lubber's line 41.

Obviously, the greatest rate of cutting the lines of the earth's field will be when the side portions of the coil 8 are cutting at right angles across the lines, i. e., when the plane of the coil is parallel to the lines. The connection between 10 and shaft 6 may be made such that when the craft is moving due north the index will point to N on the dial at the time the coil 8 is in the position just mentioned, and in that case the plane of coil 8 would then be parallel to the fore-and-aft line of the craft. If, then, the ship is turned due east, it would be necessary for the coil 8 to rotate through 90° less before reaching the position of cutting the magnetic lines most rapidly, but as that would also rotate the index through an additional 90° it would point to E on the dial 11. The same relation would hold for every angle of divergence from north that the course of the ship might make.

It will be understood that the above description and accompanying drawing comprehend only the general and preferred embodiment of my invention, and that various changes in construction, proportion and arrangement of parts may be made within the scope of the appended claims, and without sacrificing any of the advantages of my invention.

The herein described invention may be manufactured and used by or for the Government of the United States for governmental purposes without the payment to me of any royalties thereon.

Having thus described my invention, what I claim is:

1. In a compass, a supporting member, a universal joint depending therefrom, a bracket carried by the lower member of said joint, a shaft rotatably mounted in said bracket, a rotor fixed on said shaft, an inductor coil carried by said shaft, slip rings on said shaft to which the terminals of said coil are connected, brushes bearing upon said rings, a coil with the terminals connected to said brushes, a magnetically polarized core in said coil having its poles reflexed to be adjacent each other, a vibratile armature disposed between said poles, a contact so placed that said armature may be drawn thereagainst, a circuit comprising an inductive coil and a battery in series connected to said armature and said contact, a condenser shunted across said circuit, a compass dial, an illuminable index rotatable over said dial and having electrical contact with said dial at one of its ends, a coil in inductive relation with the coil in said circuit and havng one terminal connected to said index and the other connected to said dial, and a flexible shaft drivingly connecting said shaft and said index.

2. In a compass, a rotatable shaft suspended to be free to assume a vertical position, means to drive said shaft, an inductor coil carried by said shaft, a relay coil whereof the terminals are respectively connected to the terminals of said inductor coil, a core in said coil having juxtaposed poles, a vibratile armature disposed between said poles, a compass dial, an illuminable index rotatable over said dial and having electrical connection with said dial at one end of said index, a flexible shaft drivingly connecting said shaft to said index, a contact disposed to be contactable by said armature, a circuit comprising a coil and a battery in series connected to said armature and said contact, and a secondary coil inductively related to the coil in said circuit and having one terminal connected to said index and the other connected to said disk.

3. In a compass, a rotatable shaft suspended to be free to assume a vertical position, means to drive said shaft, an inductor coil carried by said shaft, a circuit comprising a battery and a primary inductive coil, a polarized relay connected to said inductor coil to be actuated by the current generated in said inductor to open said circuit, a dial, an illuminable index rotatable over said dial and having an end in electrical contact with said dial, positive driving means connecting said index and said shaft, and a secondary inductive coil disposed adjacent the said primary coil and having one terminal connected to said index and the other to said dial.

4. In a compass, an inductor coil disposed to cut the magnetic lines of the earth's field when rotated, a rotatable shaft on which said coil is mounted, a circuit including a primary inductive coil, means actuatable by current from said inductor to break periodically said circuit, a dial, an illuminable index rotatable thereover and having an end in electrical contact with said dial, positive driving means connecting said shaft and said index, and a secondary inductive coil disposed adjacent to said primary and having one terminal connected to said index and the other to said dial.

5. In a compass, a supporting structure, a universal joint depending therefrom, a shaft rotatably supported by the lower element of said joint, a motor rotor fixed on said shaft, a high permeability inductor mounted on said shaft, said inductor having oppositely extending arms, a stationary coil around said inductor between said arms, a biramous magnet, a member between the poles of said magnet to which the terminals of said coil are connected, a vibratile armature mounted on said member, a contact disposed to be contactable by said armature, a circuit comprising a battery and a primary coil in series connected to said armature and said contact, a condenser shunted across said circuit, a plate having a cut away portion in the edge thereof, a compass disk rotatably mounted on said plate, a secondary coil disposed adjacent said primary, a lamp connected to said secondary coil and disposed to illuminate said disk at the cut away portion of said plate, and a flexible shaft drivingly connecting said shaft and said disk.

6. In a compass, a shaft suspended to be free to assume a vertical position, means to rotate said shaft, an inductor mounted on said shaft, said inductor having oppositely extending arms, a coil around said inductor between said arms, a biramous magnet, a vibratile armature between the poles of said magnet and connected to be actuatable by current from said inductor, a contact disposed to be contactable by said armature, a circuit including a primary inductive coil connected to said contact and to said armature, a plate having a cut away portion in its edge, a compass disk rotatably mounted on said plate, a positive driving connection between said disk and said shaft, a secondary inductive coil disposed adjacent said primary, and a lamp connected to said secondary and placed to illuminate said disk at the cut away portion of said plate.

7. In a compass, a rotatable shaft, means to drive said shaft, an inductor mounted on said shaft, said inductor having oppositely extending arms, a coil disposed to have potential generated in it by magnetic flux changes in said inductor, a biramous magnet, a vibratile armature disposed between the poles of said magnet, means connecting said armature to said coil whereby said armature is actuatable by current from said coil, a circuit including a primary inductive coil connected to said armature in such manner that said circuit is broken by movement of said armature in one direction, a compass disk, a plate on which said disk is rotatably mounted, positive driving means between said shaft and said disk, a secondary coil inductively related to said primary coil, and a lamp connected to said secondary and disposed to illuminate a portion of said disk when lighted.

8. In a compass, a rotatable shaft, means to rotate said shaft, an inductor rotatably drivable by said shaft, said inductor having oppositely extending arms, a coil disposed to have a potential generated in it by changes in magnetic flux through said inductor, a biramous magnet, a circuit including a primary inductive coil, an armature disposed between the poles of said magnet and connected to the first mentioned coil to be actuatable by current from said coil to break said circuit, a rotatable compass disk, a plate on which said disk is mounted, a driving connection between said disk and said shaft, a secondary coil inductively related to said primary coil, and a lamp connected to said secondary coil and disposed to illuminate a portion of said disk when lighted.

9. In a compass, a rotatable shaft, means to rotate said shaft, inductive means actuated by said shaft and rotatable in the earth's magnetic field, a polarized relay actuatable only by maximum current from said inductive means, a circuit including a source of current and a primary inductive coil, means to open said circuit actuatable by said relay, rotatable direction indicating means driven from said shaft, and a secondary inductive coil related to said primary to have currents induced therein and connected to illuminate said direction indicating means upon opening of said circuit.

10. In a compass, an inductive device rotatable in the earth's magnetic field, a circuit including an inductive coil, means to open said circuit actuatable only by maximum current generated by said device operatively connected to said device, rotatable direction indicating means driven synchronously with said device, and means operable by current induced by said inductive coil to illuminate said direction indicating means upon opening of said circuit.

11. In combination, an inductor rotatable in the earth's magnetic field to generate an alternating current, a relay operatively connected to said inductor to be actuated to circuit-closing position by current therefrom once in each revolution of said inductor, indicating mechanism including a flashing device operating in positive synchronism with said inductor and means connecting said device to the circuit controlled by said relay to cause said device to be illuminated at the time of actuation of said relay.

12. In combination, a freely suspended inductor rotatable in the earth's magnetic field, indicating mechanism including a part continuously rotating in one direction, driving means positively connected to said inductor to operate said part in synchronism with said inductor, and means to cause said indicating mechanism to give an indication at the time said inductor is in a predetermined position with respect to the earth's magnetic field.

ROSS GUNN.